WILLIAM M. WATSON.

Improvement in Car-Starters.

No. 127,531.         Patented June 4, 1872.

WITNESSES.
E. H. Bates
Geo. E. Upham.

INVENTOR.
William Medd Watson
Chipman Hosmer & Co,
Attys

127,531

UNITED STATES PATENT OFFICE.

WILLIAM MEDD WATSON, OF TONICA, ILLINOIS.

IMPROVEMENT IN CAR-STARTERS.

Specification forming part of Letters Patent No. 127,531, dated June 4, 1872.

*To all whom it may concern:*

Be it known that I, WILLIAM M. WATSON, of Tonica, in the county of La Salle and State of Illinois, have invented a new and valuable Improvement in Car and Wagon Starters; and I do hereby declare that the following is a full, clear, and exact description of the construction and operation of the same, reference being had to the annexed drawing making a part of this specification, and to the letters and figures of reference marked thereon.

Figure 1:
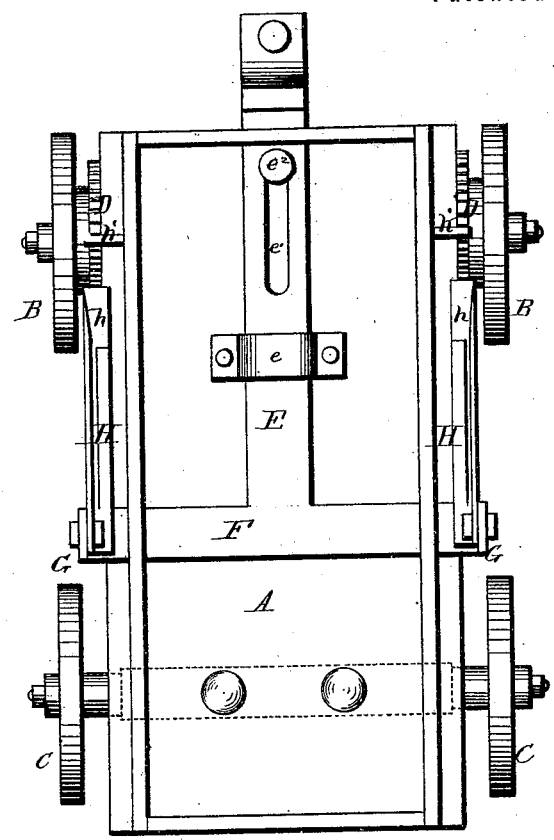
Figure 2:
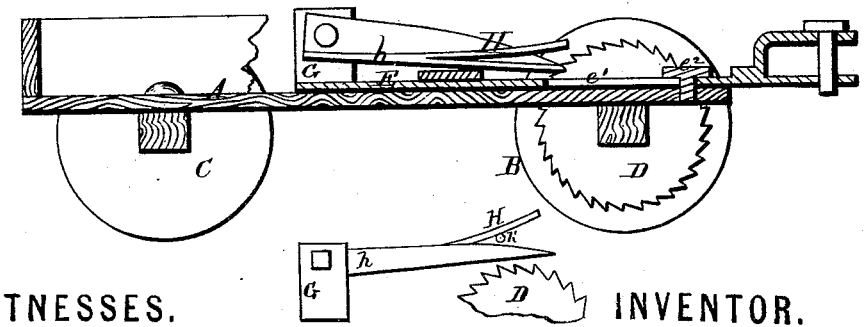

Figure 1 of the drawing is a representation of a top-plan view of my invention. Fig. 2 is a side view, part sectional, of the same.

This invention has relation to horse-car or wagon-starters; and consists in the construction and novel arrangement of a weighted pawl with a lifting-arm pivoted behind the front wheels to a sliding frame connected with the pole, and arranged to engage with the front wheels when said frame is pulled forward by the action of the horses in their attempt to draw the vehicle, substantially as hereinafter described.

Referring to the drawing, A represents the body of a wagon, car, or other conveyance; B B the front; and C C the hind wheels. Attached to the inner faces of the front wheels are the ratchet-wheels D D. E designates a bar running lengthwise of the vehicle, and having its front end adapted to the coupling or hitching thereto of the horses. This bar is arranged to slide to and fro, and passes underneath a loop-plate, $e$, attached to the car or wagon-body. The bar E is slotted at $e^1$. A pin, $e^2$, inserted in the bottom of the vehicle passes through the slot, and serves to guide the bar. To the rear end of the bar E is attached a transverse bar, F, the ends of which pass through slots in the sides of the vehicle, and are attached to or bent up so as to form vertical standards G. To these standards are pivoted dogs $h$, which reach forward, and are so arranged as to engage with the ratchet-wheels D D. As soon as the horses begin to pull the bar E is drawn forward, and the dogs brought into contact with the ratchets, which they turn, and through them turn the front wheels B, thereby giving the vehicle a sufficient start. H represents arms attached to the dogs, and arranged at angles, as shown. These arms pass over studs $h'$, projecting from the sides of the vehicle, and, after the dogs have acted, keep the latter above the ratchets.

What I claim as my invention, and desire to secure by Letters Patent, is—

The pawl $h$, pivoted in rear of the wheel to standards G, on a sliding hitch-frame, and provided with the inclined arm H, in combination with the ratchet-wheel D and the lifting-stud $h'$, all constructed and arranged as specified.

In testimony that I claim the above I have hereunto subscribed my name in the presence of two witnesses.

WILLIAM MEDD WATSON.

Witnesses:
HENRY GUNN,
ISAAC RAYMOND, Jr.